Aug. 18, 1936.   A. L. EMENS   2,051,293
ELECTRIC METER
Filed Oct. 13, 1934
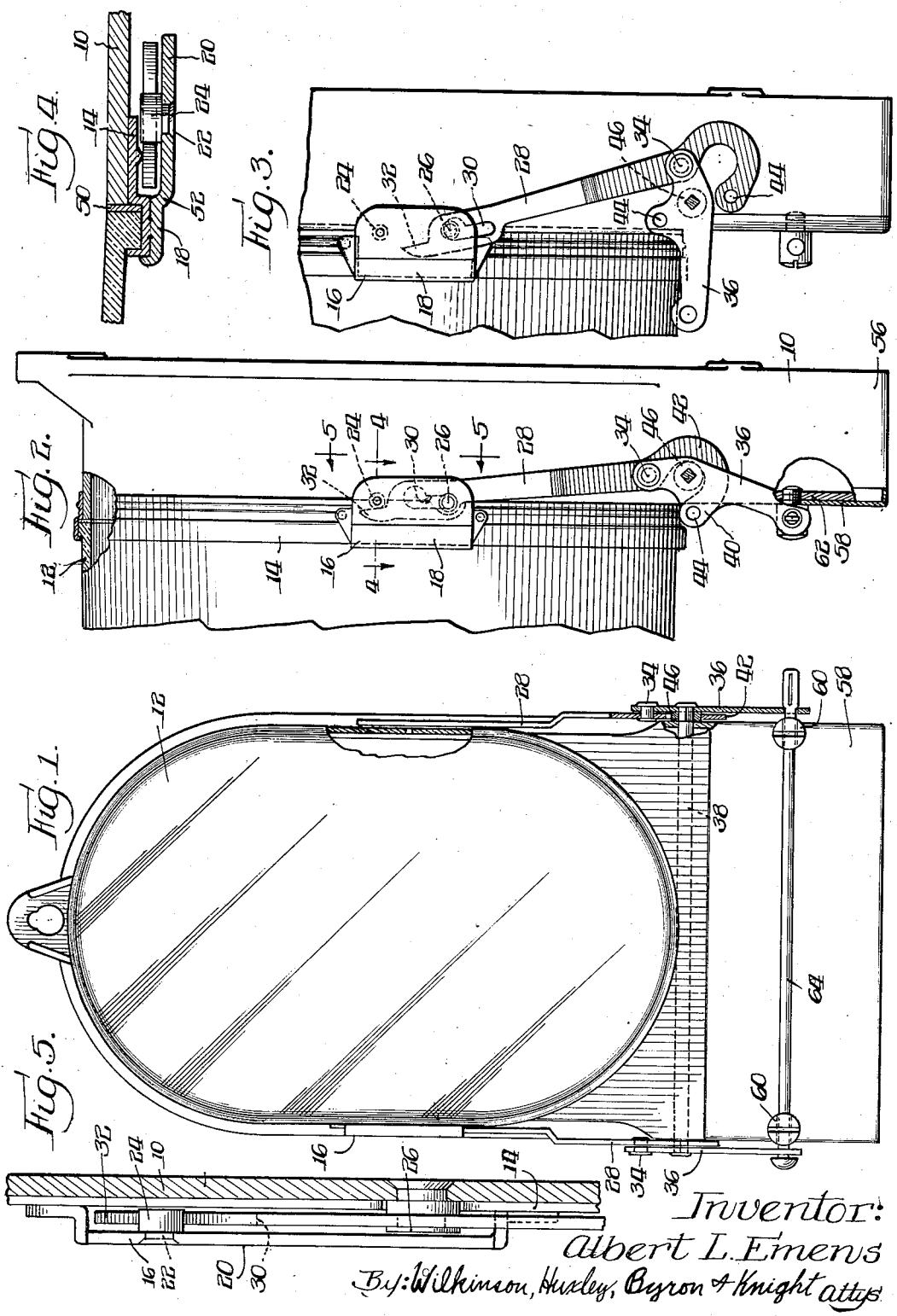
Inventor:
Albert L. Emens
By: Wilkinson, Huxley, Byron & Knight attys Patented Aug. 18, 1936

2,051,293

UNITED STATES PATENT OFFICE 2,051,293

ELECTRIC METER

Albert L. Emens, La Fayette, Ind., assignor to Duncan Electric Mfg. Co., La Fayette, Ind., a corporation of Illinois Application October 13, 1934, Serial No. 748,164

17 Claims. (Cl. 171—34)

This invention relates to electric meter casings, and has been illustrated as embodied in a meter casing for containing two or more meter elements, although in many of its aspects it could be embodied in closure devices for other electrical apparatus casings. Two or more meter elements are used for measuring power in polyphase circuits.

In electric meters it is very important to have a casing which is tamper-proof or as nearly so as possible. Otherwise there are many people who would endeavor to steal electricity by doing something to the meter which will make it indicate less than the actual consumption of power. For the sake of convenience and permanence in attaching the meter it is common practice to use a metal base, and for the sake of visibility of the meter indicators, it is common practice to use a glass cover. In the old days, the cover was secured in place by two threaded studs which extended therethrough and on which were screwed thumb screws or the like, the unscrewing of which was prevented by a sealing wire. The holes through which the threaded studs passed formed excellent channels of access for tapering. In single unit meters the studs have been displaced by an arrangement by which the glass cover is secured along its edge to the metal base. This is most conveniently done by giving the glass cover rotative movement, as when bayonet clamps are used. It is obvious, however, that for such a rotative attachment the cover should be round, especially as it is desirable to have a cover and a meter base partially telescoped. In the case of meters such as polyphase meters, in which two or more elements are enclosed in the same casing, it is impractical to have a meter cover round, but instead it usually has an elongated or oval shape such as that shown. It therefore follows that in connection with casings having non-circular covers, there is a special problem of securing tight tamper-proof locking means. It is of course obvious that the locking means should be easy to operate, both for locking and opening, and should be capable of effective and easy sealing with the customary sealing wires. It may be explained that these sealing wires comprise merely a short lentgh of rather small wire joined in loop formation with a lead seal which would indicate tapering, the loop thus formed tying together two parts which must be separated in order to open the cover. It is therefore the object of the present invention to solve this special problem of safely and conveniently securing a non-circular cover, together with such incidental problems as may arise. In the illustrated form of the invention, the solution is found in the combination including a pair of lock bars which are slidable to engage lugs on opposite sides of a glass cover, each of which is operated by a pivoted operating lever, the two operating levers being mounted on a key to a common rod, so that operation of the lever releases both sliding lock bars.

With these and various other objects in view, the invention may consist of certain novel features of construction and operation, as will be more fully described and particularly pointed out in the specification, drawing and claims appended hereto.

In the drawing, which illustrates an embodiment of the device, and wherein like reference characters are used to designate like parts.

Figure 1 is a front view of the illustrated form of the invention with part of the cover broken away;

Figure 2 is a fragmentary side view of the same;

Figure 3 is a similar view showing levers in the released position;

Figure 4 is a fragmentary sectional view along the line 4—4 of Figure 2; and

Figure 5 is a fragmentary sectional view along the line 5—5 of Figure 2.

Although my invention may take many forms, only one has been chosen for illustration. This form is embodied in a base 10 preferably of metal, a cover 12 preferably of glass, a collar band 14, preferably of metal, together with special locking features hereinafter described. Since the special problem which the invention solves relates to non-circular meter covers, the cover is illustrated as being oblong, although of course the invention could be used with a circular cover if desired. The collar band 14 is wrapped around the cover, and its two ends may be joined in any way, as by each being spotwelded to a locking bracket 16, as shown in Figure 2. The cover is anchored within the band by the interlocking flanges shown at the upper edge of Figure 2. As shown in Figure 1, another locking bracket 16, identical to the one shown in Figure 2, may be spotwelded or otherwise secured to the collar band on the oposite side of the cover from the locking bracket 16 shown in Figure 2. The locking bracket 16 is shown in longitudinal section in the right hand side of Figure 1, in transverse section in Figure 4, and in an enlarged back view in Figure 5. From these figures it is seen that there is an attachment portion 18 which contacts the collar band 14 along the forward and side edges of the locking bracket 16. Extending from this attachment portion is a shield portion 20 which is suitably spaced from the collar band 14 to permit the locking features to be almost therebetween. These locking features include a pin 22 which has an enlarged head 24, which if desired may bear a friction reducing roller, though none has been shown.

Also positioned within the shield 20 when the cover is on, but riveted to the base instead of the shield is a stud 26 having an enlarged head. Mounted to slide on this stud is a locking lever 28 in which is a slot 30 preferably of the key-hole type, through which the stud 26 extends. The key-hole type of slot is preferred to facilitate assembly or replacement of the locking lever. The locking lever 28 is provided with a bayonet end 32 which may engage the head 24 of pin 22, as shown in Figures 1 to 5. The locking lever 28 is pivoted as by the riveted pin 34 to an operating lever 36. The operating levers on both sides are mounted on a common operating rod 38 in which they are keyed, as by being provided with square holes engaging square ends of the rod 38, as illustrated in Figures 1 and 2. The operating rod 38 is rotatively carried by the base 10, and extends therethrough from side to side.

To lock the operating levers and the locking levers against movement, operating lever 36 is provided with an extension 40, and locking lever 28 is provided with an extension 42, which extensions are provided with holes 44 which register with one another when the levers are in the locked position, and are preferably positioned slightly above the base 10 so that a rod may be passed through the holes 44 on the levers on both sides of the meter if desired. The extension 42 partially encircles the rod 38 which is provided with a spacing washer 46, the primary purpose of which is to space the operating lever 36 sufficiently from the base 10 so as to leave free operating room for the extension 42. The extension 42 and the washer 46, however, may if desired have the additional function of limiting the movement of the levers so that in moving them to the locked position they cannot be moved beyond the point at which the holes coincide.

In locking the meter cover in position once it has been placed in the position shown in Figure 3, it is merely necessary to turn one operating lever 36 from the position shown in Figure 4 to the position shown in Figure 2. This by means of the rod 38 rotates the other operating lever likewise and these two operating levers slide the two locking levers 28 from the position shown in Figure 3 to the position shown in Figure 2, the bayonet 32 engaging the pin 22 to press the cover firmly against the base 10. To make the joint between the cover 12 and the base 10 substantially water-tight, a washer 50 may be provided if desired. In unlocking the cover, either one of the levers 36 is moved in the reverse direction from the position shown in Figure 2, to the position shown in Figure 3, thereby sliding down both of the locking levers 28 to the position shown in Figure 3. It is noted that in this releasing operation the locking levers 28 are given a slight rotative movement about the stud 26. This causes the bayonet 32 to press against the shoulder 52 of the locking bracket 16 and against the adjacent shoulder on the collar 14, and thereby presses the cover loose from the base so that it may be easily removed. Of course if this automatic loosening action should not be desired, it may be dispensed with by merely cutting away a portion of the shoulders mentioned, or by slightly rearranging the position of the parts.

The meter base 10 may usually be provided with a lower integral terminal chamber portion 56 and often with a cover 58 for this portion. When it is desired simultaneously to lock the terminal chamber cover 58 and the meter cover 12, this may be done by screwing one or more locking screws 60 through the cover 58 into the terminal chamber 56. A lug or flange 62 may be provided on the inside of the wall of the terminal chamber for this purpose. The screws 60 are preferably provided with holes therethrough, through which may be passed a sealing bar 64, as shown best in Figure 1. The sealing bar 64 may have a slot or hole in its end as illustrated through which the usual sealing wire may be passed to pass also through some other hole, such as the coinciding holes 44 and to be sealed by the usual lead sealing slug, the sealing wire not being shown. It should be understood, of course, that even if the bar 64 is not used, or even if it is passed through the holes 44 instead of being used in the position shown in Figure 1, the sealing wire would usually be used in addition.

As is readily seen, the construction illustrated is very simple of operation and manufacture, and very effective in preventing tampering with the meter. The structures on the two sides of the meter are substantially identical and may be entirely so, although as illustrated, both of the shields 20 are braced at their tops more than at their bottoms. The engagement of the locking levers 28 with the stud 26 and the pin 22 is protected by the shield 20 which extends back beyond the same.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. A meter case comprising: a base, an oblong cover for said base, lugs on said cover substantially diametrically opposed, and a plurality of locking levers each secured to said base and arranged to engage one of said lugs; said levers being slidable and mounted on said base, and having bayonet portions for engaging said lugs.

2. A meter case comprising: a base, an oblong cover for said base, lugs on said cover substantially diametrically opposed, a pair of locking levers each secured to said base and arranged to engage one of said lugs, and means for jointly operating both of said levers.

3. A meter case comprising: a base, an oblong cover for said base, lugs on said cover substantially diametrically opposed, a locking lever secured to said base and arranged to engage one of said lugs, and means for jointly operating both of said levers comprising separate operating levers one engaged to each locking lever and both keyed to a common shaft rotatably carried by said base.

4. A meter case including: a base; a plurality of symmetrically disposed fastening devices operable by a common operating means and each including a pin mounted on said base; and a locking lever having a slot and sliding on said pin by means thereof, and having a bayonet portion for engaging a lug on a cover member.

5. A meter case including: a base; a plurality of symmetrically disposed fastening devices operable by a common operating means and each including a pin mounted on said base; a locking lever having a slot and sliding on said pin by means thereof, and having a bayonet portion for engaging a lug on a cover member; said pin having an enlarged head to retain said locking lever, and said slot being of the key-hole shape so that in the unlatched position of said locking lever said locking lever may be removed from said pin.

6. A meter case including: a base; a plurality of symmetrically disposed fastening devices operable by a common operating means and each including a pin mounted on said base; a locking lever having a slot and sliding on said pin by means thereof, and having a bayonet portion for engaging a lug on a cover member; and a cover member having a lug thereon positioned to be engaged by the said bayonet portion.

7. A meter case including: a base; a plurality of symmetrically disposed fastening devices operable by a common operating means and each including a locking lever slidably secured thereto, and having a bayonet portion for engaging a lug on a cover member; a cover member having a lug thereon positioned to be engaged by the said bayonet portion; and a shield positioned to protect said locking lever and said lug when said locking lever is locking said cover in position.

8. A meter case including: a base; a locking lever slidably secured thereto, and having a bayonet portion for engaging a lug on a cover member; a cover member having a lug thereon positioned to be engaged by the said bayonet portion; and a shield positioned to prevent removal of the locking lever which is otherwise removable and to protect said locking lever and said lug when said locking lever is locking said cover in position, said shield comprising an extension of the cover member and being removable with said cover member to increase the accessibility of said locking lever.

9. A meter case including: a base; a locking lever slidably secured thereto, and having a bayonet portion for engaging a lug on a cover member; and an operating lever pivoted to said base and to said locking lever in such manner that the rotation of the operating lever slides the locking lever.

10. A meter case including: a base; a locking lever slidably secured thereto, and having a bayonet portion for engaging a cover member; and an operating lever pivoted to said base and to said locking lever in such manner that the rotation of the operating lever slides the locking lever and simultaneously rotates it in a direction to draw the cover on tighter as the locking lever is slid in a cover-engaging direction.

11. A meter case including: a base; a locking lever slidably secured thereto, and having a bayonet portion for engaging a cover member; an operating lever pivoted to said base and to said locking lever in such manner that the rotation of the operating lever slides the locking lever and simultaneously rotates it in a direction to draw the cover on tighter as the locking lever is slid in a cover-engaging direction; and means for limiting the movement of said levers to the position of maximum drawing-on of the cover.

12. A meter case including: a base; a locking lever slidably secured thereto, and having a bayonet portion for engaging a cover member; an operating lever pivoted to said base and to said locking lever in such manner that the rotation of the operating lever slides the locking lever and simultaneously rotates it in a direction to draw the cover on tighter as the locking lever is slid in a cover-engaging direction; means for limiting the movement of said levers to the position of maximum drawing-on of the cover; and a sealing hole in each lever, said sealing holes being positioned to come into registry at the said last named position.

13. A meter case including: a base; a locking lever slidably secured thereto, and having a bayonet portion for engaging a cover member; and an operating lever pivoted to said base and to said locking lever in such manner that the rotation of the operating lever slides the locking lever; said base having a terminal chamber portion and means for securing a cover on said terminal chamber, and said operating lever and said means having sealing holes which are aligned when the respective covers are secured.

14. A meter case including: a base; a locking lever slidably secured thereto, and having a bayonet portion for engaging a cover member; and an operating lever pivoted to said base and to said locking lever in such manner that the rotation of the operating lever slides the locking lever; said base having a terminal chamber portion and means for securing a cover on said terminal chamber, said operating lever and said means having sealing holes which are aligned when the respective covers are secured, and said operating lever and said locking lever having sealing holes which come into registry when said locking lever is in a locking position whereby these levers may be sealed independently of the terminal chamber cover.

15. A meter case including: a base; a plurality of symmetrically disposed fastening devices operable by a common operating means and each including a pin mounted on said base; a locking lever having a slot and sliding on said pin by means thereof, and having a bayonet portion for engaging a lug on a cover member; and securing means for securing said locking lever in a locking position, said locking lever between its points of engagement with the cover and with the securing means being of such length, shape and quality as to be resilient to a substantial degree.

16. A meter case including a base, a locking lever secured thereto and having a bayonet portion for engaging a lug on a cover member, a cover member having a lug thereon positioned to be engaged by the said bayonet portion; and a shield positioned to prevent removal of the locking lever which is otherwise removable and to protect said locking lever and said lug when said locking lever is locking said cover in position, said shield comprising an extension of the cover member and being removable with said cover member to increase the accessibility of said locking lever.

17. A meter case including a base, a locking lever removably secured thereto and having a bayonet portion for engaging a lug on a cover member; a cover member having a lug thereon positioned to be engaged by the said bayonet portion; and a shield positioned to prevent removal of the locking lever which is otherwise removable and to protect said locking lever and said lug when said locking lever is locking said cover in position, said shield comprising an extension of the cover member and being removable with said cover member to increase the accessibility of said locking lever.

ALBERT L. EMENS.